May 15, 1945.  G. T. JACOCKS  2,376,146
STILL
Filed March 11, 1943  2 Sheets-Sheet 1

INVENTOR
George T. Jacocks
BY
Lyman E. Dodge
ATTORNEY

May 15, 1945. G. T. JACOCKS 2,376,146
STILL
Filed March 11, 1943 2 Sheets-Sheet 2
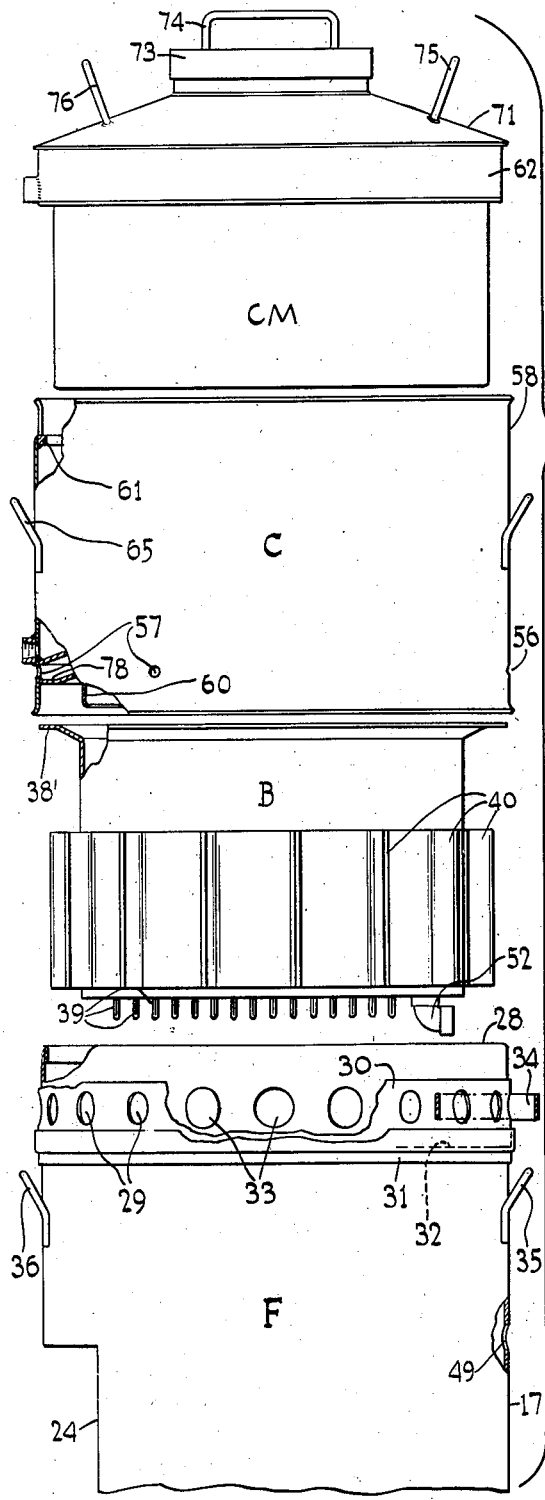
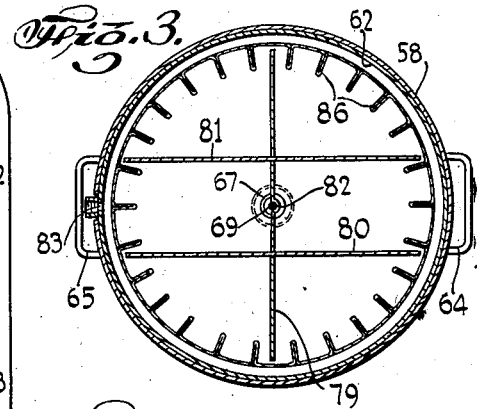
Fig. 3.
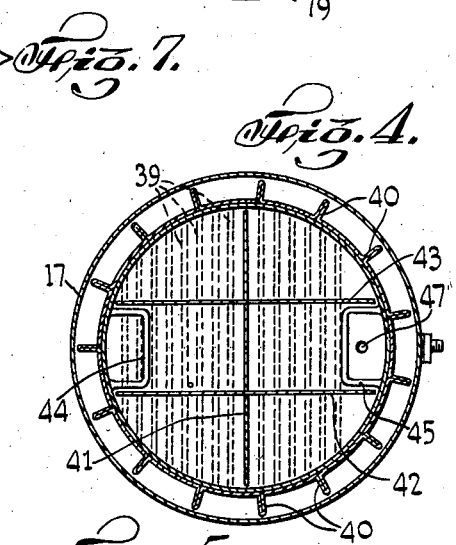
Fig. 4.
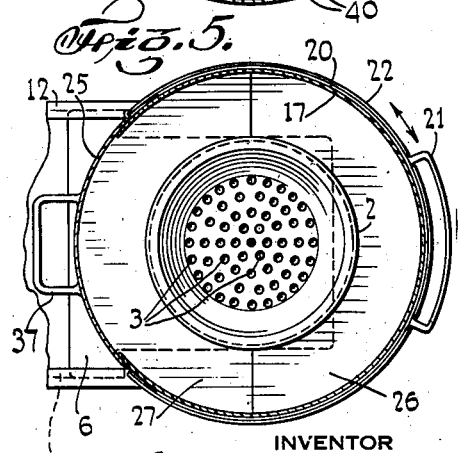
Fig. 5.
Fig. 7.
INVENTOR
George T. Jacocks
BY
Lyman E. Dodge
ATTORNEY Patented May 15, 1945

2,376,146

UNITED STATES PATENT OFFICE 2,376,146

STILL

George T. Jacocks, New Rochelle, N. Y., assignor to Heat Transfer Products, Inc., New York, N. Y., a corporation of New York Application March 11, 1943, Serial No. 478,845

1 Claim. (Cl. 202—192)

This invention relates to stills, particularly to water stills, and more especially to portable water stills.

A principal object of this invention is the production of a device of the type specified which is compact but efficient.

A further object of the invention is the production of a device of the type specified which so constructed and may be made of such size that it may not only be easily and conveniently transported by human beings as a back pack but may also be included as necessary equipment for such devices as life boats and rafts.

Other objects and advantages will appear as the description of the invention and the particular physical embodiment selected to illustrate the invention progresses and the novel features will be particularly pointed out in the appended claim.

Figure 1:
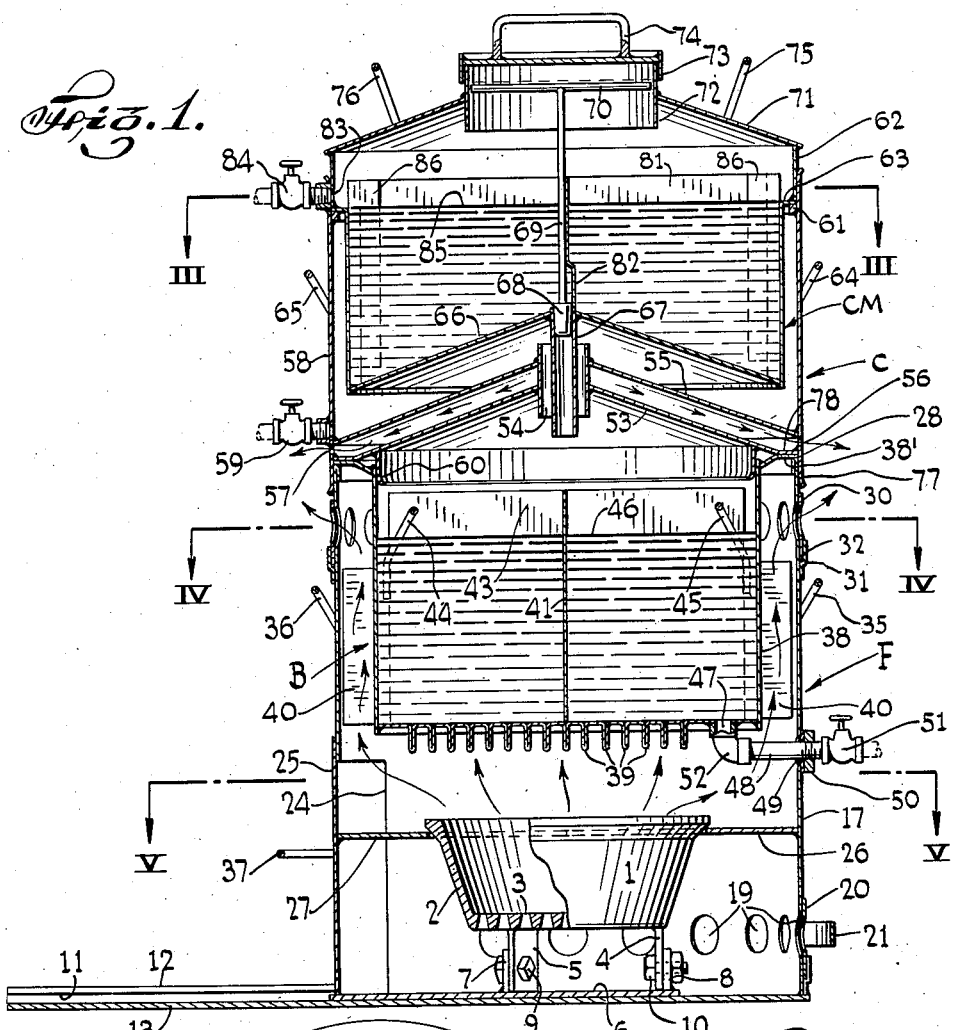
Figure 2:
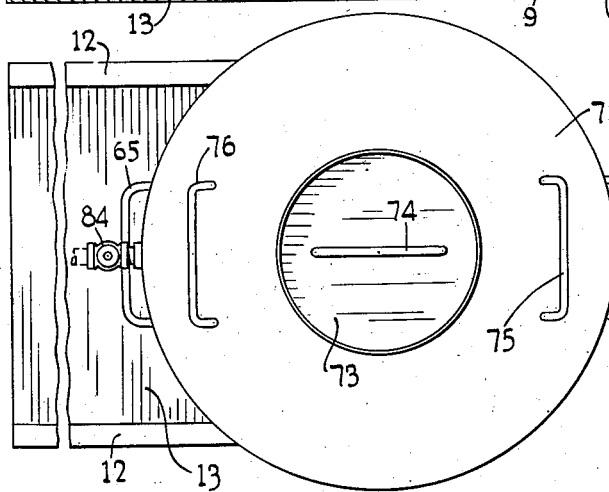
Figure 6:
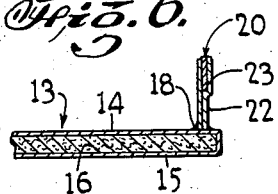

In describing the invention and the particular physical embodiment selected to illustrate the invention, reference will be had to the accompanying drawings and the several views thereon, in which, like characters of reference designate like parts throughout the several views, and in which:

Figure 1 is a vertical sectional view of a device embodying my invention; Fig. 2 is a top plan view of the device illustrated in Fig. 1; Fig. 3 is a cross-sectional view on the plane indicated by the line III—III of Fig. 1, viewed in the direction of the arrows at the ends of the line; Fig. 4 is a cross-sectional view on the plane indicated by the line IV—IV of Fig. 1, viewed in the direction of the arrows at the ends of the line; Fig. 5 is a cross-sectional view on the plane indicated by the line V—V of Fig. 1, viewed in the direction of the arrows at the ends of the line; Fig. 6 is an enlarged detail view of the lower right-hand corner of the device as shown in Fig. 1; Fig. 7 is a side elevational exploded view of the device as shown in Fig. 1.

The still comprises, in general, as best shown in Fig. 7, a furnace F for supplying heat; a boiler B for containing impure water to be distilled; a condensing chamber C, in which vapors are condensed; and a cooling medium containing vessel and initial container for the impure water to be evaporated CM.

The furnace F, as best shown in Fig. 1, includes a fire pot 1. This fire pot may be constructed of any suitable or appropriate material and in any appropriate form. I prefer a pot constructed of cast iron and of generally circular form. It is best made with a flaring side wall 2, an open top, and a perforate bottom 3.

The pot 1 being adapted to burn solid fuel, such as briquettes, charcoal, and anthracite coal, therein by means of air passing upward through the perforate bottom 3 must have a free space thereunder. I provide this by suitably supporting the pot. Supports, as legs, as 4 and 5 preferably positioned under the pot.

Convenience requires the construction to be such that the pot may be, at times, removed wholly or partially, from within the furnace. To provide for this, I prefer to attach the legs 4 and 5 to a slide plate 6. This may be done by means of lugs, as 7 and 8, attached to the plate 6, to which the legs, as 4 and 5, may be attached, as by bolts, as 9 and 10. The slide plate 6 is preferably mounted to slide in grooves, as 11, of trackway 12.

A member 13 of plate like form is positioned under the slide plate 6. This member is preferably formed with an upper metal plate 14, a lower spaced metal plate 15 and a filling of heat insulating material 16 therebetween. This filling may well be powdered magnesia or asbestos, either powdered or shredded. This plate like member 13 serves to protect any body on which the furnace is mounted from the heat thereof.

A shell 17, of metal, preferably sheet iron, surrounds the fire pot 1. This shell is attached to plate like member or base 13 in any usual or customary way, as by welding, as at 18. The lower portion of the shell is pierced by a plurality of apertures, as 19. The apertures permit the entrance of air to the fire pot. In order to regulate the volume of air, a damper 20, also apertured in a like manner is preferably used to regulate the volume of air. This damper 20, in somewhat semi-circular form partially surrounds the furnace wall and may be oscillated, exposing more or less of the apertures 19, by means of operating handle 21. The damper is well held in operative position, to be oscillated, by a tab member 22, forming a groove 23 in which the lower edge of the damper rests, as best shown in Fig. 6.

The side of the furnace shell wall is cut away at 24, to provide an opening through which the fire pot may be withdrawn. This opening is closed when the slide 6 is fully in the inner position, as shown in Fig. 1, because a furnace opening cover 25 is mounted on the slide 6 in position and is of such area that it completely closes the opening 24 when the fire pot is positioned as shown in Fig. 1.

Adjacent the upper edge 28 of the furnace wall, further apertures are formed, as 29, to allow the smoke and heated air, arising from the fire pot, to escape to atmosphere. These apertures likewise are provided with a circular band, likewise apertured, as at 33, and supported on flange 31 providing a groove 32 in which the lower edge of the band is positioned and which permits the baand or smoke damper 30 to be oscillated to uncover wholly or partially the apertures 29. A handle 34 is provided for ease of manipulation.

By suitable adjustment of fire damper 20 and smoke damper 30, the fire in fire pot 1 may be closely regulated.

In order to provide a convenient means for handling the furnace, the handles 35 and 36 are provided.

A handle 37 is also attached to door 25 so that it, together with slide 6, may be conveniently moved and adjusted.

Above the fire pot 1 and within the furnace is positioned the boiler B. This boiler is formed of sheet metal, most preferably copper in sheet form. In general form, it is practically a hollow cylinder, open at the upper end and having a thin side wall 38. At the upper edge, a flange 31 is provided. This flange is a complete circle and is positioned and formed to rest upon the upper turned over edge 28 of the furnace. By so resting, it serves to support the boiler. The bottom of the boiler may be plain sheet metal but efficiency is greatly increased by corrugating the bottom. Most preferably the adjacent corrugations should also be squeezed together, as shown in Fig. 1 at 39. The bottom is preferably made of a separate sheet and soldered or brazed in place around its circumferential edge and the inside surface of the bottom is also, preferably, tinned.

In order to increase the absorption of heat, fins, as 40, are attached to the vertical sides of the boiler. These fins are preferably integral and, preferably, in effect, corrugations with the adjacent folds pressed close together.

In order to prevent undue bodily movement of water in the boiler, baffles are placed therein to break up the bodily movement as a whole. These baffles preferably take the form of vertical plates 41, 42, and 43, crossed as best shown in Fig. 4, and extending quite across the boiler and substantially from top to bottom thereof.

As the boiler may be separated from the furnace by merely lifting it out for cleaning or repair or even transportation, handles, as 44 and 45 are attached to the inside thereof in a suitable or appropriate manner, as by brazing.

Impure water to be distilled is placed in the boiler B up to the line 46. Such height of water is suitable and is such that violent ebullition does not project it beyond the rim of the boiler.

The bottom of the boiler is provided with an orifice 47, into which is secured, as by brazing, the end of an outlet duct or pipe 48. This duct passes through the wall 17 of the furnace F through an aperture 49 therein and may be attached by a threaded lock washer or nut 50. The end of the duct 48 may be provided with a suitable valve 51 screwed thereon and readily removable to permit the boiler B to be removed from the furnace. In fact the duct 48 may also be readily separated at elbow 52 to further render possible and facilitate this removal.

Positioned on the top of the furnace F is the condenser C. This condenser is likewise formed of sheet metal, most preferably copper. It is, in form, a hollow cylinder. It fits nicely over the outside of the furnace wall and is limited by the bottom wall 53 resting on the flange 38', which, in turn, rests upon the top edge of the furnace wall.

The bottom wall of the condenser is conical, and, at the centre, terminates at the wall of a vapor passage 54. Just above, but spaced from the bottom wall 53 is a similar wall 55. The space between these two walls provides a thermal insulation to prevent, as much as possible, heat exchange between plate 53 and cooler bodies above plate 55, so that vapor, contacting plate 53, will be condensed in minimum amount. I also prefer to allow air to flow freely through the space between the plates and to that end form a plurality of orifices, as 56 and 57, through the wall of the condenser and opening into the space between the plates.

The vapor from the boiler B passes through the vapor passage 54 and is condensed above plate 55 and then falls on that plate. After falling on the plate it runs down the plate to the lowest points thereof, that is, to where the plate 55 joins the side wall 58 and may then be drawn off or allowed to drip out of valve 59.

In order to centralize the boiler B, a depending flange 60 is attached to plate 53 and snugly fits the interior surface of boiler B. This also serves to prevent vapor from escaping to undesired places.

Toward the upper end of the condenser C a shoulder or ridge 61 is attached to the inner face of the wall of the condenser C. This shoulder is preferably brazed to the condenser C. It serves as a support for the cooling medium vessel.

Handles 64 and 65 are provided on the condenser so that it may be readily handled.

Inserted into the condenser C is a cooling medium containing vessel CM. This vessel is made of metal, most preferably copper. Its outside diameter is such that it may be inserted inside the shoulder and it is provided with a cooperating shoulder or shoulders so that it may rest upon the shoulder ring. The preferred shoulder is one formed by making the cooling medium containing vessel of different diameters. A smaller diameter so that the vessel may be inserted in the ring, and a larger diameter, as at 62, so that a shoulder is formed at 63 which may rest on the ring.

The bottom of the cooling medium containing vessel is conical, as appears at 66. From its central portion a supply pipe or duct 67 depends so that fluid in the container may be, when desired, caused to flow into the boiler B. At the upper end of the supply pipe 67, a plug 68 is provided, which when in place presents flow of fluid from the container CM. In order to manipulate the plug, a convenient rod 69 is attached thereto and extends upwardly terminating in a cross piece 70.

The top of the container CM is provided with a cover 71, conical in form, and in the central portion a circular flange 72 is formed depending somewhat below the general surface of the top portion of the cover and also extending somewhat above it. A manually operable cover 73 is positioned above and about the upward extension of the flange and is provided with a convenient handle 74. The cover 71 also has handles 75 and 76 attached thereto so that the complete container CM may be lifted bodily.

The container CM fits nicely, with a sliding fit, as at 77, over the upper end of the furnace wall 17. It is positioned by the portion 78 of sheet 53 coming into contact with the flange 38 of the boiler B, which flange rests on the end 28 of the wall of the furnace.

Within the cooling medium container CM there is a baffle formed of plates 79, 80, and 81 crossed at about a right angle and plate 79 is suitably bent out at the central lower portion thereof, as at 82 to allow movement of plug 68.

It is desired to establish, at times, a definite volume of water or other fluid in the container. To accomplish this, an orifice 83 is formed in the side wall of the container and a valve 84 attached thereto. When the valve is opened, all fluid in the container will run out down to line 85, so that it will then be known that a definite volume is in the container regardless of how much may have been poured in through the opening of flange 72.

When operating the still, the plug 68 is put in place and valve 84 opened. Then sufficient impure water is placed in the container CM to fill it to the line 85. Then with the boiler B in place, as shown in Fig. 1, the condenser C is mounted in place, as shown in Fig. 1, and the water in CM is allowed to flow into boiler B. The plug 68 is then put in position, as shown in Fig. 1, and the container CM again filled while valve 86 is closed. Slide 6 with the fire pot 1 is drawn out, proper kindling and fuel placed therein and ignited. The slide is returned to the position as shown in Fig. 1 and the dampers 20 and 30 adjusted for proper combustion.

The heat supplied by the fuel in the fire pot 1 is applied to the bottom of the boiler as radiant heat, and as heated air to the side walls and fins 40. The vapors from the boiler B rise and pass through the vapor duct 54 and come in contact with the cold bottom 66 of the container CM, condense, fall on the conical surface 55, and flow to valve 59, from whence the distilled water may be drawn as required or allowed to constantly drip into a suitable container.

Vapors which do not condense on the bottom 66 rise and coming in contact with the side wall of the container CM are condensed and drop to the same place as the condensate formed on the bottom. The efficiency of heat exchange between the vapors and the cooling medium in the container CM is increased by the positioning of a plurality of metal fins 86 in the container. These fins make metallic and heat conducting contact with the wall of the container and extend into and make contact with the water therein.

After about the one-third of the impure water in boiler B has been vaporized, the residue is allowed to flow out through valve 51, and then after the water line in container CM is established at line 85, the plug 68 is operated and the water in container CM is allowed to flow into boiler B. Immediately, container CM is refilled with the impure water.

Considerable conservation of heat is accomplished by first using the water in container CM for cooling vapors and then using it in boiler B to be vaporized.

The device hereinbefore shown and described is particularly designed as equipment for life boats or rafts, but is equally useful for small bodies of armed troops traversing a region where potable water is inadequate or absent. Almost any combustible material may be used in the fire pot, but where available, charcoal or briquettes are most convenient.

Although I have particularly described one particular physical embodiment of my invention, nevertheless, it is desired to have it understood that the particular form selected merely illustrates one particular physical embodiment of the idea of means underlying my invention and does not exhaust the possible physical embodiments thereof.

What I claim new and desire to secure by Letters Patent of the United States, is:

A still, including, in combination: a furnace with side walls formed of sheet metal in substantially the form of a hollow cylinder, said cylinder formed with a plurality of combustion products exits adjacent the top edge thereof and with an opening in the side wall adjacent the bottom thereof; a movable slide adapted to close the opening adjacent the bottom; a firepot adapted to be positioned within the furnace; means for sliding said firepot into said furnace and withdrawing it therefrom through said opening adjacent the bottom thereof; a vessel formed of sheet metal in substantially the form of a cylinder with a closed lower end and an open upper end, said vessel adapted to receive water to be evaporated and formed with fins at the bottom and sides thereof whereby heat interchange is more readily effected between the water in the vessel and hot gases surrounding the vessel and said vessel formed with a flange surrounding its top and adapted to fit on the end of the furnace wall of sheet metal; a condensing chamber formed of sheet metal in substantially the form of a hollow cylinder and formed with depending flanges adapted to fit over the furnace shell at the top thereof and formed with a duct providing a passage for air from one side to the other of the condensing chamber and formed as a partition at the bottom of the condensing chamber separating the condensing chamber from the space above the vessel for containing water to be evaporated, said condensing chamber formed at the top for the reception of a cover; a cover closing the top of the condensing chamber and provided with a central opening provided with a cover; a vessel for receiving water formed substantially as a hollow cylinder with a conical bottom and formed with flanges adapted to rest upon a shoulder of the condensing chamber; a shoulder formed upon the inside of the condensing chamber; a duct projecting from the bottom of the vessel for containing water positioned within the condensing chamber, said duct adapted to deliver water into the vessel for receiving water positioned in the furnace; a plug for closing the said duct; manual means for operating the plug; a duct formed through the said partition adapted to allow vapors to flow therethrough whereby water placed in the vessel in the furnace may be distilled and cooled by water placed in the vessel in the condensing chamber and whereby, after the water placed in the vessel in the condensing chamber has become heated, it may be allowed to flow into the vessel in the furnace and whereby the vapors are condensed on the lower conical surfaces of the vessel in the condensing chamber and means to receive the condensed water.

GEORGE T. JACOCKS.